Aug. 8, 1950     R. W. DILLAVOU     2,517,850
COMBINATION AIRPLANE AND WING UNIT FOR SAME
Filed Nov. 8, 1948     2 Sheets-Sheet 2
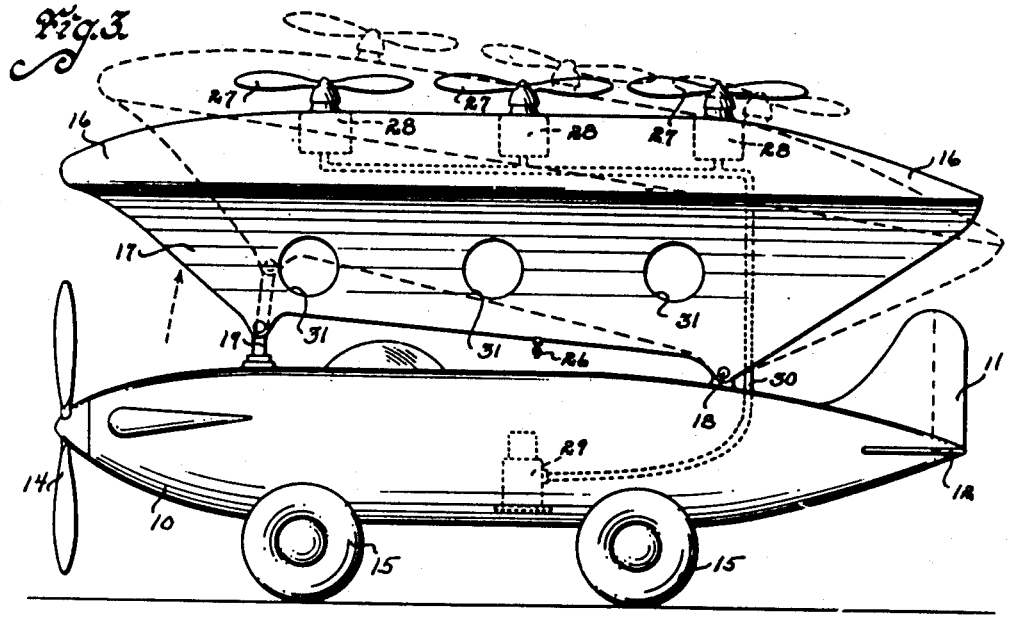
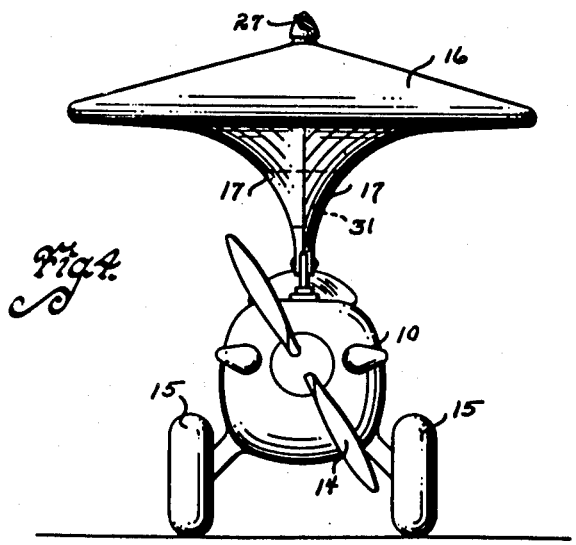
Witness
Edward P. Seeley
Inventor
Robert W. Dillavou
by M. Talbert Dick
Attorney Patented Aug. 8, 1950

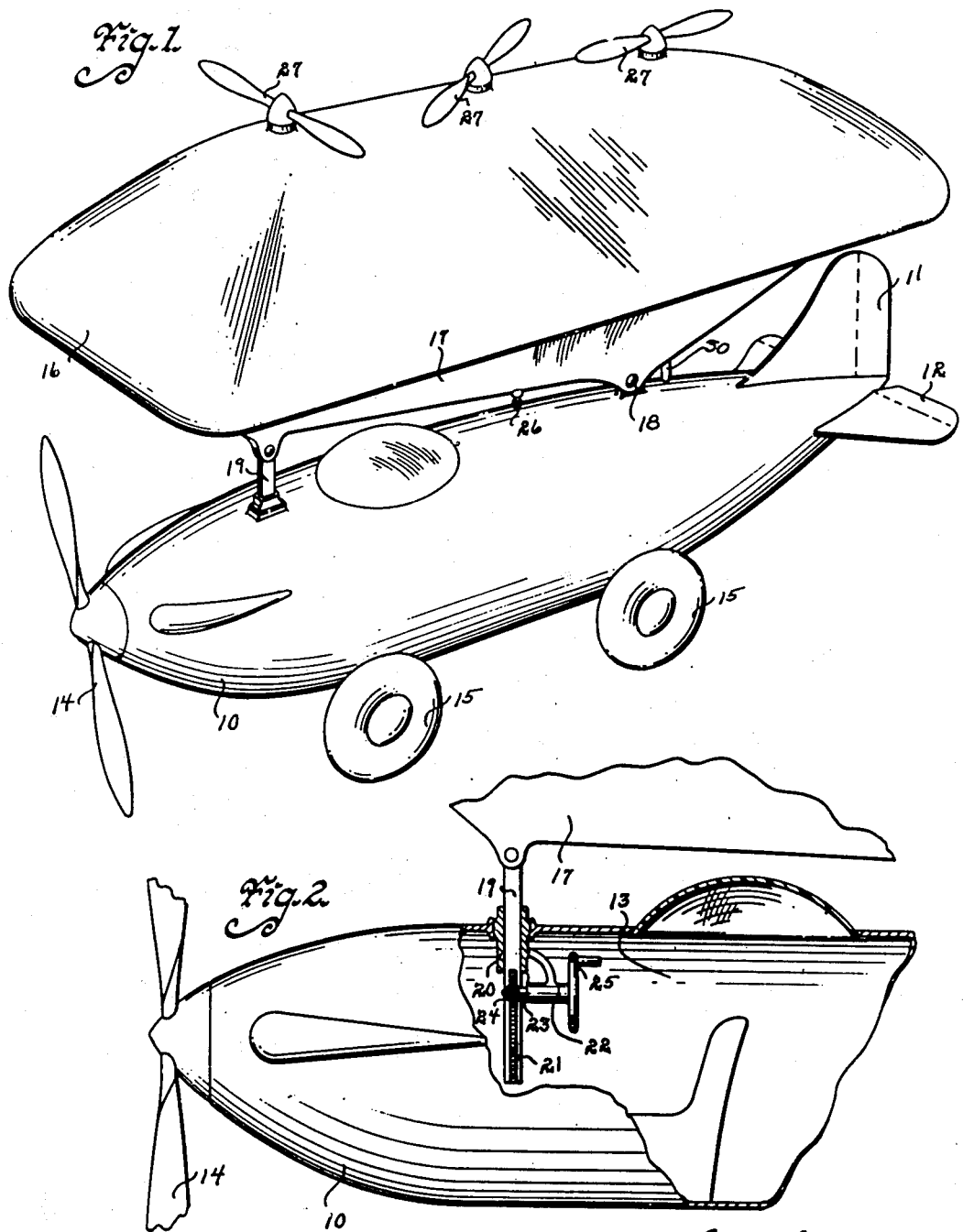

2,517,850

UNITED STATES PATENT OFFICE 2,517,850

COMBINATION AIRPLANE AND WING UNIT
FOR SAME

Robert Wade Dillavou, Libert Township,
Marshall County, Iowa

Application November 8, 1948, Serial No. 58,883

7 Claims. (Cl. 244—5)

The principal object of my invention is to provide a combination airplane for use in the air, on water, or on the ground.

A further object of this invention is to provide an airplane that is safe and capable of getting into and out of small landing areas.

A still further object of my invention is to provide an airplane, that should the prime mover fail for any reason, will descend at a safe speed and in substantially a perpendicular path.

A still further object of my invention is to provide a wing construction for airplanes and like that is highly stable in flight.

A still further object of this invention is to provide an airplane that is easy to fly and safe in all types of weather.

A still further object of my invention is to provide an airplane that has simplified flight controls.

Still further objects of this invention are to provide an airplane that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my craft.

Fig. 2 is a side view of a portion of my craft illustrating one means for changing the angle of the wing assembly relative to the fuselage.

Fig. 3 is a side view of my craft.

Fig. 4 is a front end view of my craft and illustrates the underside design of the wing assembly.

In all present day fixed wing type airplanes the craft is quite stable in flight as long as the craft is moving rapidly ahead. However, with or without power failure if sufficient forward speed is not realized, the craft will stall, complete control will be lost; and the airplane will spin nose downwardly. If sufficient height is not present, the craft will obviously ground-crash before the pilot can re-establish control. In the case of fog and bad weather even considerable altitude may not save the craft and occupants from destruction. My craft, on the other hand, in case of motor failure, or in case of a stall, or in case the pilot becomes unable to operate the craft for any reason, will descend downwardly with the body of the craft in normal horizontal position, and such downward movement will be similar to that of a stabilized parachute.

Referring to the drawings I have used the numeral 10 to generally designate the fuselage of my craft. If the craft is to be used on water for either taxiing, landing or taking off, this fuselage should be water-proof, such as in present day amphibian airplanes, or else the usual pontoons should be used. The fuselage has the usual rudder 11, elevators 12, cockpit 13, and front propeller 14. If the craft is to be used on the road it should have four wheels 15, as shown in the drawings. However, any suitable wheel support may be used and if desired may be of the folding or retractable type. The main feature of my craft is the top air foil or wing unit which is located substantially above the body of the craft. This wing unit is generally designated by the numeral 16 and has a length parallel with the fuselage much greater than its width. In fact, the length of the wing is substantially that of the longitudinal length of the body of the craft, as shown in Fig. 3, and extends longitudinally thereof instead of transversely as in present day airplanes. The upper surface of the wing may be of any suitable design to realize the most efficiency, but the lower side or bottom of my wing is of special important design, i. e., the under surface extends from near each side inwardly and downwardly in a curved path to a plane slightly above the fuselage of the craft. From the pilot's cockpit the wing unit therefore extends upwardly and outwardly to the right and to the left, in curved surfaces. By this construction the wing will have along its bottom longitudinal center a downwardly extending wedge shaped blade portion 17, as shown in Fig. 4. At least several results are obtained by incorporating this portion 17 in the wing unit. The main wing portion will be a substantial distance above the fuselage and in case of descent without power, the center of gravity will be relatively low, whereby the fuselage will be maintained at all times suspended properly below the wing, and the wing will act as a parachute canopy for lowering the craft gently to the ground. Obviously, with such relatively high lift resistance the craft will never spin in. Also by the portion 17, the air will not "pocket" under the wing during the descent, but will pass to each side of the wing without undue turbulence. This will prevent the fuselage from acting in the manner of a swinging pendulum during descent and will insure the fuselage landing in a proper upright position on all wheels when it does make contact with the earth. Still another advantage is that the craft is most stable in flight and the use of ailerons are unnecessary when turning the craft in the air. Also the vertical web action of the portion 17 acts as a stabilizing fin and prevents the craft from yawing during flight. To attach the wing unit to the fuselage, I hinge the rear bottom portion of the portion 17 at the numeral 18 to the rear top of the fuselage, and at the forward bottom portion of the portion 17 I hinge it to a rectangular shaft 19. This shaft 19 slidably extends into a vertical bearing member 20 mounted in the fuselage. On the shaft 19 is a toothed rack 21. The numeral 22 designates a bearing having a rotatably mounted shaft 23. On one end of this shaft is a spur gear 24 in engagement with the rack 21 and on its other end is a handle means 25 for rotating the shaft. By this means, the pilot can easily change the angle of attack of the wing unit relative to the fuselage merely by cranking the shaft upward or downwardly. Enough play should be provided in the hinge joints to prevent binding during the raising or lowering of the front end of the wing unit. Certain additional features may be incorporated in my craft. The entire wing unit casing may be air sealed so that a lighter than air gas such as helium may be placed and held therein. Such a gas would not only provide a certain amount of lift, but would hold the wing unit vertically above the fuselage at all times. This feature is desirable during landing, with or without power. Also if the craft is to be an amphibian type craft it will be maintained in proper upright position while on the water. A valve stem 26 is provided for the injection of the gas into the wing unit. Also if desired, horizontal lifting propellers 27 may be rotatably mounted at the center top of the wing unit, as shown in the drawings. Any suitable means may be used to rotate these propellers. An example would be to use air motors 28 connected to an air pump 29 by a conduit 30. The air pump may in turn be connected to the prime mover of the craft. Such propellers 27 giving vertical lift would permit the craft to descend or ascend practically vertically with power. The main feature of my craft, however, is the wing unit, with or without the lifting propellers or with or without the buoyant gas within the same. One feature of this wing unit is transverse air passageways 31 through the portion 17. Such openings are ineffective when the craft is flying forwardly. However, when taking off cross-wind the air will not "pocket" on one side of the portion 17, but will freely pass through the openings 31, thereby preventing the wing unit from action as an objectionable sail. Also when descending, the air passing to each side of the portion 17 may equalize itself as to pressure, thereby making a smoother descent.

Some changes may be made in the construction and arrangement of my combination airplane and wing unit for same without departing from the real spirit and purpose of my invention, and it is my intention to cover by my claims, any modified forms of structure or use of mechanical equivalents which may be reasonably included within their scope.

I claim:

1. In a device of the class described, a fuselage, a propeller for moving said fuselage forwardly, airfoil controls on said fuselage, an airfoil wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging one end portion of said flange portion to said fuselage, and a means for slidably adjustably securing the other end portion of said flange portion to said fuselage, said wing unit having its ends spaced apart from said fuselage so that the air stream can pass under said wing unit and past its trailing edge.

2. In a device of the class described, a fuselage, a propeller for moving said fuselage forwardly, airfoil controls on said fuselage, an airfoil wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging one end portion of said flange portion to said fuselage, a means for slidably adjustably securing the other end portion of said flange portion to said fuselage, and horizontal lifting propellers rotatably mounted above said wing unit and a means for rotating said propellers at times, said wing unit having its ends spaced apart from said fuselage so that the air stream can pass under said wing unit and past its trailing edge.

3. In a device of the class described, a fuselage, a propeller for moving said fuselage forwardly, airfoil controls on said fuselage, an airfoil wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging one end portion of said flange portion to said fuselage, a means for slidably adjustably securing the other end portion of said flange portion to said fuselage, and means for supporting said fuselage upon a supporting surface, said wing unit having its ends spaced apart from said fuselage so that the air stream can pass under said wing unit and past its trailing edge.

4. In a device of the class described, a fuselage, a propeller for moving said fuselage forwardly, airfoil controls on said fuselage, an airfoil wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging one end portion of said flange portion to said fuselage, and a means for slidably adjustably securing the other end portion of said flange portion to said fuselage; said wing unit and said flange portion designed for and capable of holding a gas lighter than air, said wing unit having its ends spaced apart from said fuselage so that the air stream can pass under said wing unit and past its trailing edge.

5. In a device of the class described, a fuselage, a propeller for moving said fuselage forwardly, airfoil controls on said fuselage, a wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging one end of said flange portion to said fuselage; a rack bar pivotally secured to the other end of said flange portion, a sleeve mounted in said fuselage and slidably embracing said rack bar, a support arm mounted near the lower end of said sleeve, a shaft journaled in said support arm, a means for rotating said shaft connected to one end of it, and a gear keyed on the other end of said shaft in meshing relation with said rack bar.

6. In a device of the class described, a fuselage, a propeller for moving said fuselage forwardly, airfoil controls on said fuselage, a wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging the rear of one end of said flange portion near the rear of said fuselage, a rack bar pivotally secured to the other end of said flange portion, a sleeve mounted near the front of said fuselage and slidably embracing said rack bar, a support arm mounted near the lower end of said sleeve, a shaft journaled in said support arm, a means for rotating said shaft connected to one end of it, and a gear keyed on the other end of said shaft in meshing relation with said rack bar.

7. In a device of the class described, a fuselage, a propeller for moving said fuselage forwardly, airfoil controls on said fuselage, a wing unit having a length parallel with and above said fuselage; said wing unit having a width much less than its length, a downwardly extending flange portion extending along the center longitudinal bottom of said wing unit and having its two sides curved inwardly and downwardly to provide a curved wedge-shape in cross-section, a means for hinging one end portion of said flange portion to said fuselage, and a means for slidably adjustably securing the other end portion of said flange portion to said fuselage; said wing unit and said flange portion designed for and capable of holding a gas lighter than air, an air passageway extending transversely through said flange portion, horizontal lifting propellers rotatably mounted above said wing unit and a means for rotating said propellers at times.

ROBERT WADE DILLAVOU.

REFERENCES CITED

The following references are of record in the file of this patent:

UNITED STATES PATENTS

| Number | Name | Date |
|---|---|---|
| 798,007 | Branch | Aug. 22, 1905 |
| 1,209,625 | Russell | Dec. 19, 1916 |
| 1,424,491 | Langevin | Aug. 1, 1922 |
| 1,743,284 | Refsland | Jan. 14, 1930 |
| 1,753,075 | Vincent | Apr. 1, 1930 |
| 1,777,992 | Pratt | Oct. 7, 1930 |
| 1,781,455 | Glanschnig | Nov. 11, 1930 |
| 1,813,627 | Lanier | July 7, 1931 |
| 2,141,984 | Hilmy | Dec. 27, 1938 |
| 2,426,086 | Fehr | Aug. 19, 1947 |

FOREIGN PATENTS

| Number | Country | Date |
|---|---|---|
| 678,182 | France | Dec. 23, 1929 |